United States Patent
Kakura et al.

[11] Patent Number: 5,923,226
[45] Date of Patent: Jul. 13, 1999

[54] AUTOMATIC EQUALIZER

[75] Inventors: Yoshikazu Kakura; Tomoki Osawa, both of Tokyo, Japan

[73] Assignee: NEC Corporation, Japan

[21] Appl. No.: 08/909,980

[22] Filed: Aug. 12, 1997

[30] Foreign Application Priority Data

Aug. 13, 1996 [JP] Japan ................................. 8-213779

[51] Int. Cl.$^6$ .................................................... H04B 3/04
[52] U.S. Cl. ........................................... 333/18; 375/233
[58] Field of Search ............................. 333/18; 375/230, 375/233

[56] References Cited

U.S. PATENT DOCUMENTS 4,789,994  12/1988  Randall et al. ..................... 333/18 X
5,068,873  11/1991  Murakami ............................ 333/18 X

OTHER PUBLICATIONS

H. Suzuki, et al., "Dynamic Performance Analysis on RLS Adaptive Equalizers for Mobile Radio Transmission", Journal of Papers of the Electronic Information and Communication Society of Japan, B–II, vol. J76–B–II, No. 4, pp. 189–201.

*Primary Examiner*—Paul Gensler
*Attorney, Agent, or Firm*—Ostrolenk, Faber, Gerb & Soffen, LLP

[57] ABSTRACT

The object of the present invention is to provide an automatic equalizer which can automatically equalize distortion including a precursor component with a small amount of calculation and a small circuit scale. The automatic equalizer includes a subtractor for calculating differences between a received signal and N estimated received signals and outputting N estimated error signals, a decision unit for outputting part of a transmission signal sequence corresponding to one of the N estimated error signals which exhibits the lowest absolute value as a detected signal as the output of the automatic equalizer, a tap coefficient generation circuit for receiving the received signal as an input thereto to produce an impulse response and outputting the impulse response as a first tap coefficient group corresponding to a postcursor component of the impulse response and a second tap coefficient group corresponding to a precursor signal of the impulse response, a transversal filter for receiving the detected signal and the first tap coefficient group as inputs thereto and outputting a postcursor estimation signal, and an estimated received signal generator for receiving the postcursor estimation signal and the second tap coefficient group as inputs thereto and outputting the N estimated received signals corresponding to possible N transmission signal sequences.

14 Claims, 10 Drawing Sheets

AUTOMATIC EQUALIZER

BACKGROUND OF THE INVENTION

1. Field of the Invention

This invention relates to an automatic equalizer for automatically equalizing a signal distorted by intersymbol interference.

2. Description of the Related Art

Conventional automatic equalizers include decision feedback type automatic equalizers and maximum likelihood sequence estimation type automatic equalizers.

A conventional decision feedback type automatic equalizer disclosed in the Journal of Papers of the Electronic Information and Communication Society of Japan B-II, Vol. J76-B-II, No. 4, p.191 is described with reference to FIG. 1.

Subtractor 401 subtracts estimated distortion signal Sed from received signal Sr and outputs equalized signal Seq which is improved in that the influence of distortion is reduced. Decision unit 402 receives equalized signal Seq as an input thereto, determines a value for distortion components to be removed from the received signal, and outputs detected signal Sd. Tap coefficient generation circuit 403 receives received signal Sr as an input thereto, produces an impulse response and outputs the impulse response as tap coefficient Tc. Transversal filter 404 receives detected signal Sd and tap coefficient Tc as inputs thereto to estimate distortion components and outputs estimated distortion signal Sed. Automatic equalization of the signal which has been distorted by intersymbol interference is performed by the processing described above.

Next, a conventional maximum likelihood sequence estimation type automatic equalizer disclosed in the Journal of Papers of the Electronic Information and Communication Society of Japan B-II, Vol. J76-B-II, No. 4, p.191 is described with reference to FIG. 2.

Subtractor 501 subtracts estimated received signal Ser from received signal Sr and outputs estimated error signal Seerr. Tap coefficient generation circuit 502 receives received signal Sr as an input thereto to produce an impulse response and outputs the impulse response as tap coefficient Tc. Estimated received signal generator 503 receives transmission signal sequences Scs, which are binary numbers representing 0 to P-1 and tap coefficient Tc, as inputs thereto and outputs P estimated received signals Ser.

Maximum likelihood sequence estimation circuit 504 which outputs transmission signal sequences Scs as described above receives P estimated error signals Seerr as inputs thereto and selects a signal sequence corresponding to the one of the estimated error signals Seerr which exhibits the lowest absolute value. Then, maximum likelihood sequence estimation circuit 504 determines one bit of the selected signal sequence as a value for distortion components to be removed from received signal Sr, and outputs detected signal Sd. Automatic equalization of the signal which has been distorted by intersymbol interference is performed by the processing described above.

As described above, since the conventional decision feedback type automatic equalizer produces estimated distortion signal Sed based on detected signal Sd, it cannot remove a distortion precursor component.

Meanwhile, the conventional maximum likelihood sequence estimation type automatic equalizer has another problem in that, since it must perform calculation for, where the number of taps is m, $2^m$ transmission signal sequences Scs, it involves a very large amount of calculation and requires a very large scale circuit.

SUMMARY OF THE INVENTION

The present invention has been made in view of such problems of the prior art as described above, and it is an object of the present invention to realize an automatic equalizer which can equalize distortion including a precursor component with a small amount of calculation and a small circuit scale.

In order to solve the problems described above, a first automatic equalizer provided by the present invention comprises a subtractor for receiving a reception signal and N estimated received signals and outputting N estimated error signals, a decision unit for comparing the N estimated error signals with each other and outputting part of a transmission signal sequence corresponding to the one of the N estimated error signals which exhibits the lowest absolute value as a detected signal as the output of the automatic equalizer, a tap coefficient generation circuit for receiving the received signal as an input thereto to produce an impulse response and outputting the impulse response as first and second tap coefficient groups, a transversal filter for receiving the detected signal and the first tap coefficient group as inputs thereto and outputting a postcursor estimation signal, and an estimated received signal generator for receiving the postcursor estimation signal and the second tap coefficient group which corresponds to a precursor component of the impulse response as inputs thereto and outputting estimated received signals corresponding to N possible transmission signal sequences.

A second automatic equalizer provided by the present invention comprises a subtractor for receiving a received signal and N estimated received signals and outputting N estimated error signals, a sequence selector for comparing the N estimated error signals with each other and outputting a transmission signal sequence corresponding to one of the N estimated error signals which exhibits the lowest absolute value as a selected sequence signal, a tap coefficient generation circuit for receiving the received signal as an input thereto to produce an impulse response and outputting the impulse response as first and second tap coefficient groups, a transversal filter for receiving a detected signal and the first tap coefficient group as inputs thereto and outputting a postcursor estimation signal, an estimated received signal generator for receiving the postcursor estimation signal and the second tap coefficient group which corresponds to a precursor component of the impulse response as inputs thereto and outputting the estimated received signals, a weight coefficient generation circuit for generating M weight coefficients, M being an integer equal to or smaller than $\log_2 N$, and a selected sequence storing decision unit for receiving the selected sequence signal as an input thereto to store the selected sequence signal by M times, deciding based on the weight coefficients corresponding to decision values for the same bit on the transmission side of the selected sequence signals for the M times, and outputting the detected signal as the output of the automatic equalizer.

A third automatic equalizer provided by the present invention comprises a subtractor for receiving a received signal and N estimated received signals and outputting N estimated error signals, a decision unit for comparing the N estimated error signals with each other and outputting part of a transmission signal sequence corresponding to one of the N estimated error signals which exhibits the lowest absolute value as a detected signal as the output of the automatic equalizer, a tap coefficient generation circuit for receiving the received signal and the N estimated error signals as inputs thereto and outputting first and second tap coefficient groups which vary sequentially, a transversal filter for receiving the detected signal and the first tap coefficient group as inputs thereto and outputting a postcursor estimation signal, and an estimated received signal generator for receiving the postcursor estimation signal and the second tap coefficient group which corresponds to a precursor component of an impulse response as inputs thereto and outputting the estimated received signals.

By producing estimated received signals using a decision output signal for a postcursor component of distortion and using a transmission signal sequence for a precursor component of the distortion and then using the estimated received signals for automatic equalization, automatic equalization of the distortion including the precursor component can be performed with a small amount of calculation and a small scale circuit.

DETAILED DESCRIPTION OF THE PREFERRED EMBODIMENTS

Embodiments of the present invention are described below with reference to the drawings.

Figure 1:
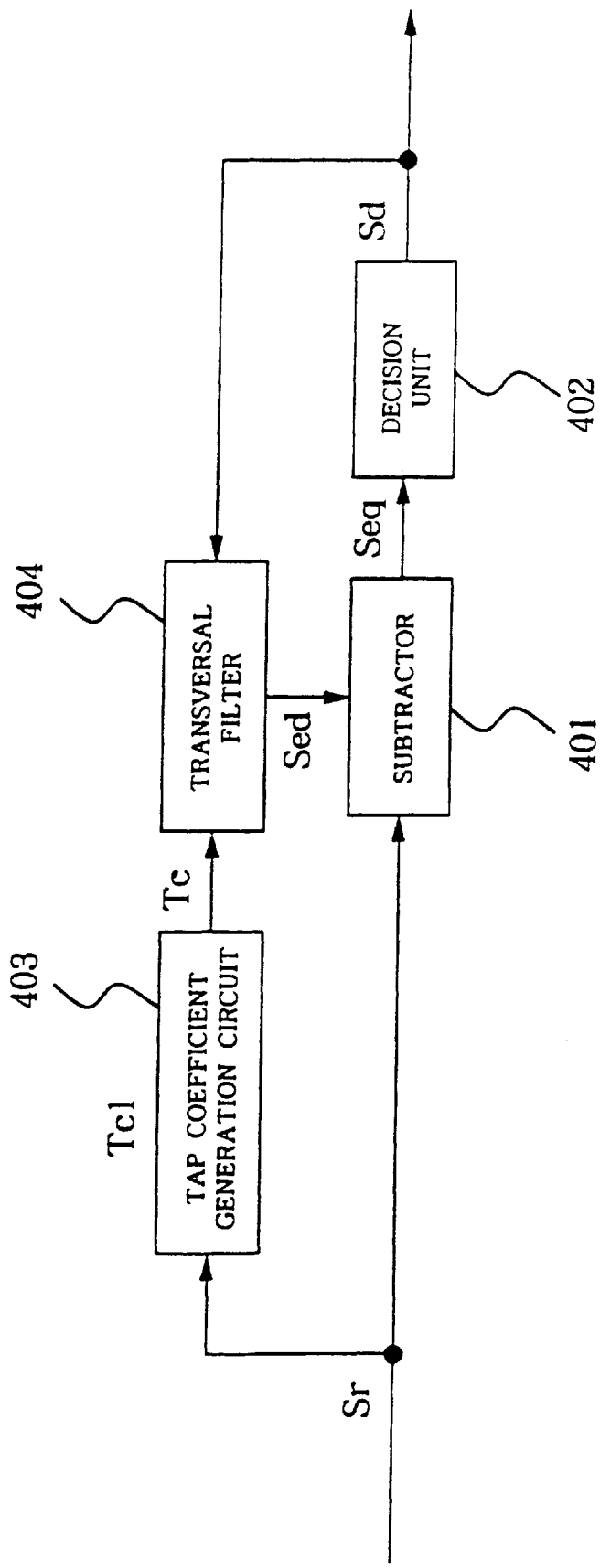
FIG. 1 is a block diagram of a first construction of a conventional automatic equalizer.
Figure 2:
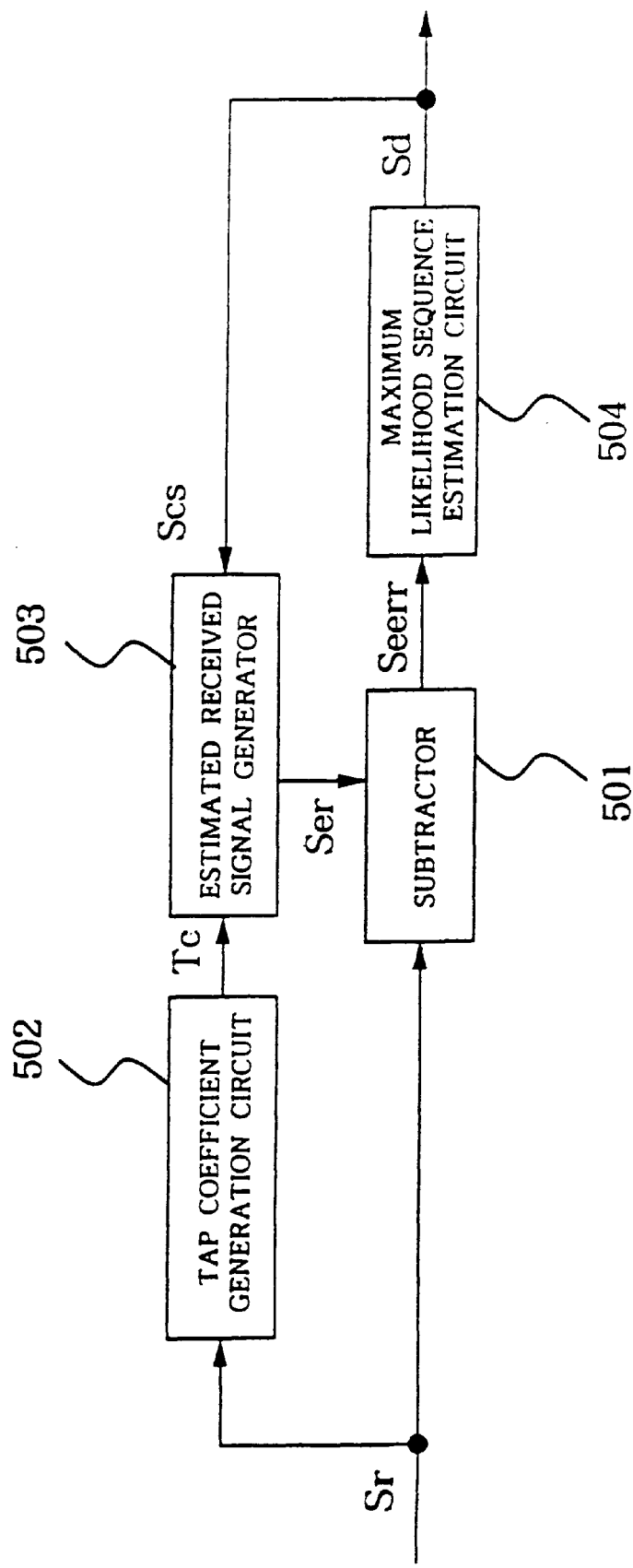
FIG. 2 is a block diagram of a second construction of the conventional automatic equalizer.
Figure 3:
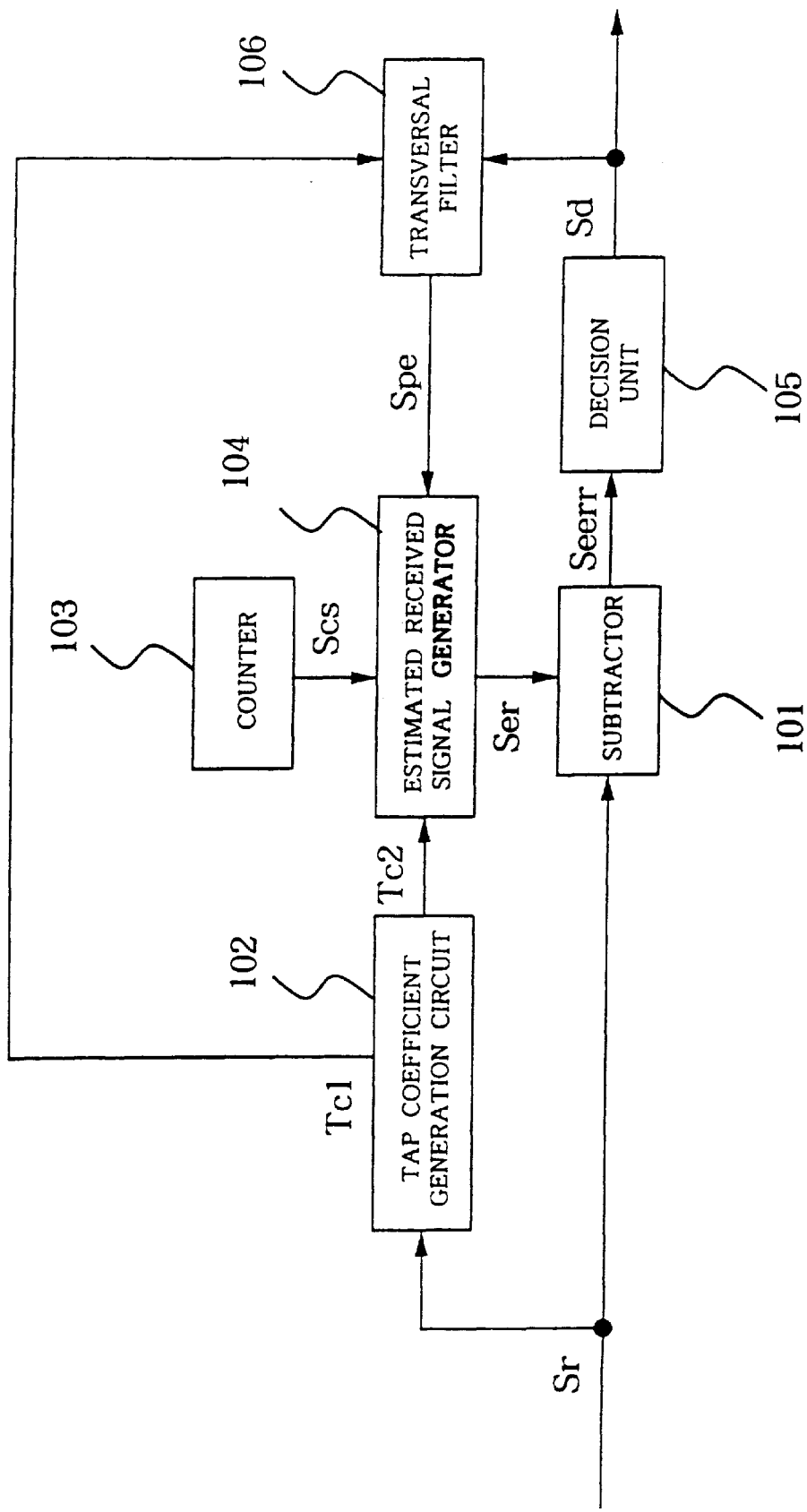
FIG. 3 is a block diagram showing a first embodiment of an automatic equalizer according to the present invention.

FIG. 3 is a block diagram showing a construction of a first embodiment of the automatic equalizer according to the present invention.

Subtractor 101 subtracts estimated received signal Ser from received signal Sr and outputs estimated error signal Seerr.

Tap coefficient generation circuit 102 receives received signal Sr as an input thereto to produce an impulse response and outputs tap coefficient group Tc1 which corresponds to a postcursor component and tap coefficient group Tc2 which corresponds to a precursor component.

Counter 103 outputs transmission signal sequences Scs which represent 0 to N−1 in the form of binary numbers.

Estimated received signal generator 104 receives tap coefficient group Tc2, transmission signal sequences Scs and postcursor estimation signal Spe as inputs thereto and outputs estimated received signal Ser which is a sum of postcursor estimation signal Spe, an estimated value of a precursor component of distortion and an estimated value of the received signal when the received signal has no distortion.

Decision unit 105 receives N estimated error signals Seerr outputted from subtractor 101, decides the least significant bit of a sequence which corresponds to one of estimated error signals Seerr which exhibits the lowest absolute value as a value obtained by removing distortion components from reception signal Sr, and outputs the least significant bit as detected signal Sd to the outside.

Transversal filter 106 receives detected signal Sd and tap coefficient group Tc1 as inputs thereto and outputs postcursor estimation signal Spe corresponding to a postcursor component of the distortion.

By the operations described above, automatic equalization of distortion including a precursor component can be performed with a small amount of calculation and a small scale circuit.

It is assumed that, for example, the number of taps of transversal filter 106 is a and transmission signal sequence Scs is formed from 3 bits. In this instance, transmission signal sequence Scs exhibits 8 different values of {000}, {001}, {010}, {011}, {100}, {101}, {110} and {111}. The upper 2 bits represent a precursor component, and the lower 1 bit represents a candidate of a received code when no distortion is involved. Now, if it is assumed that the absolute value of estimated error signal Seerr when transmission signal sequence Scs is {001} is the lowest, then this sequence is selected, and the least significant bit {1} of the sequence is outputted as detected signal Sd.

Then, if it is assumed that the absolute value of estimated error signal Seerr when transmission signal sequence Scs is {010} is the lowest, then this sequence is selected and the least significant {0} of the sequence is outputted as detected signal Sd. This operation is repeated to realize automatic equalization. While the conventional maximum likelihood sequence estimation type automatic equalizer is required to perform calculation for $2^{a+3}$ sequences, in the present embodiment, it is required to perform calculation only for $8(=2^3)$ sequences, and automatic equalization of distortion including a precursor component can be performed with a small calculation amount.

Figure 4:
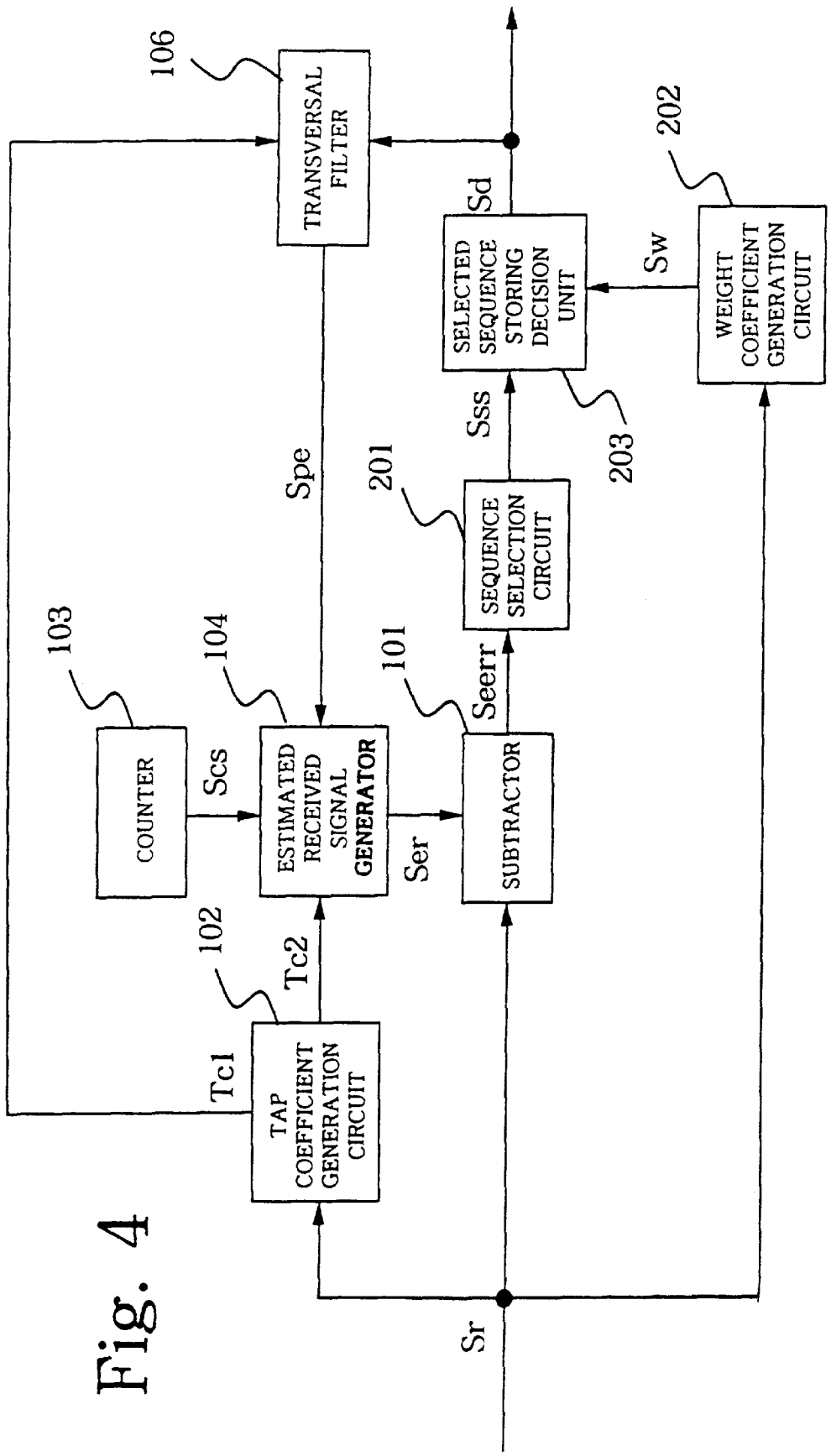
FIG. 4 is a block diagram showing a second embodiment of the automatic equalizer according to the present invention.

FIG. 4 is a block diagram showing a second embodiment according to the present invention.

Subtractor 101 subtracts estimated received signal Ser from received signal Sr and outputs estimated error signal Seerr.

Tap coefficient generation circuit 102 receives received signal Sr as an input thereto to produce an impulse response and outputs it as tap coefficient group Tc1 which corresponds to a postcursor component and tap coefficient group Tc2 which corresponds to a precursor component.

Counter 103 outputs transmission signal sequences Scs which represent 0 to N−1 in the form of binary numbers. Estimated received signal generator 104 receives tap coefficient group Tc2, transmission signal sequences Scs and postcursor estimation signal Spe as inputs thereto and outputs estimated received signal Ser which is a sum of postcursor estimation signal Spe, an estimated value of a precursor component of the distortion and an estimated value of the received signal when the received signal has not been distorted.

Sequence selection circuit 201 receives N estimated error signals Seerr as an input thereto and outputs a transmission signal sequence Scs received from the counter 103 via the estimated received signal generator 104 which corresponds to the one of the estimated error signals Seerr which exhibits the lowest absolute value as selected sequence signal Sss.

Weight coefficient generation circuit 202 receives received signal Sr and outputs weight coefficient Sw.

Selected sequence storing decision unit 203 receives M weight coefficients (M is an integer equal to or smaller than $\log_2 N$) and selected sequence signal Sss as inputs thereto, stores such selected sequence signal Sss by M times, decides a value of distortion components to be removed from received signal Sr based on weight coefficients corresponding to decision values for the same bit on the transmission side of the selected sequence signals for the M times, and outputs the decided value as detected signal Sd.

Transversal filter 106 receives detected signal Sd and tap coefficient group Tc1 as inputs thereto and outputs postcursor estimation signal Spe which corresponds to a postcursor component of the distortion.

By the operations described above, automatic equalization of distortion including a precursor component can be performed with a small amount of calculation and a small scale circuit, and also improvement against errors of a detected signal is allowed. For example, it is assumed that selected sequence storing decision unit 203 performs its decision using three weight coefficients Sw and selected sequence signals Sss for three times. Now, it is assumed that selected sequence signals Sss are {100}, {101} and {010} in an ascending order of the history. Here, the upper two bits represent a precursor component, and the lower 1 bit represents a candidate of a received code when no distortion is involved. When weight coefficients Sw are (Sw1 Sw2 Sw3), the magnitudes of the powers of received signal Sr are (P1 P2 P3) and weight coefficients Sw increase in proportion to the magnitude of the power and are {0.1 0.3 0.6} determined by Swi=Pi/(P1+P2+P3) for i=1, 2, 3, detected signal Sd is decided such that the weight of the third bit {0} of the latest selected sequence signal {010}, the weight of the second bit {0} of the second latest selection sequence signal {101} is 0.3 and the weight of the third latest selection sequence signal {100} is 0.1. When decision is to be performed with a sum total of weights for decision results, since the weight for the decision result {0} is 0.9 (0.6+0.3) and the weight for the decision result {1} is 0.1, detected signal Sd is {0}. On the other hand, when weight coefficients Sw are {0.6 0.3 0.1}, since the weight for the decision result {0} is 0.4 (0.1+0.3) and the decision result {1} is 0.6, detected signal Sd is {1}.

Figure 5:
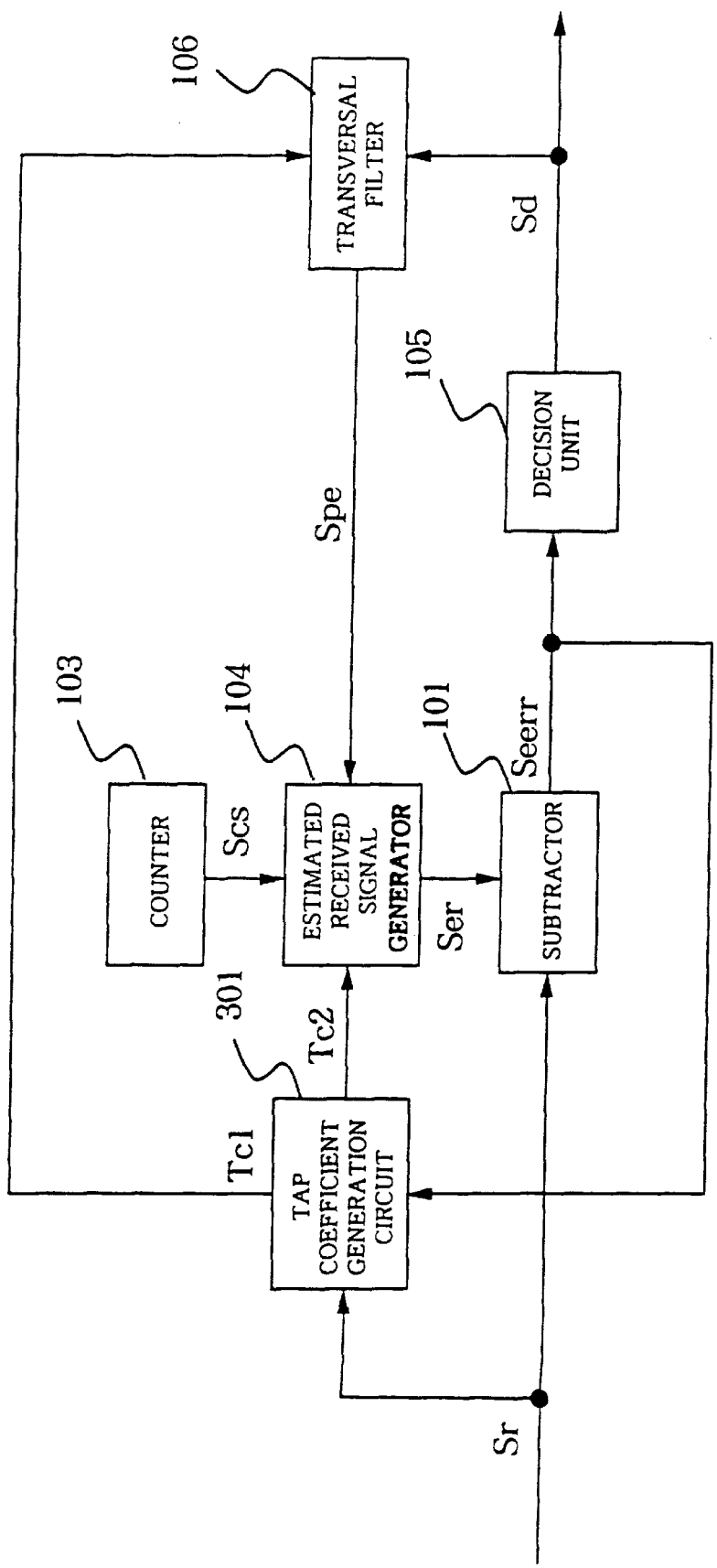
FIG. 5 is a block diagram showing a third embodiment of the automatic equalizer according to the present invention.

FIG. 5 is a block diagram showing a third embodiment of the present invention. The automatic equalizer of FIG. 5 has substantially the same construction as that of the embodiment of FIG. 3, it is different only in that tap coefficient generation circuit 301 receives received signal Sr and N estimated error signals from subtractor 101 as inputs thereto and sequentially varies and outputs tap coefficient group Tc1 and tap coefficient group Tc2 in response to a variation of the propagation environment. As an algorithm for updating tap coefficient group Tc1 and tap coefficient group Tc2, there is a method wherein tap coefficient group Tc1 and tap coefficient group Tc2 are controlled so that one of N estimated error signals Seerr which exhibits the lowest absolute value may approach zero using, for example, the LMS method. It is assumed that tap coefficient group Tc1 is (Tc11, Tc12, ..., Tc1m), tap coefficient group Tc2 is (Tc21, Tc22, ..., Tc2n), detected signal Sd is (Sd1, Sd2, ..., Sdm) in an ascending order of the history, and estimated received signal Ser is (Ser1, Ser2, ..., Sern) (where m and n are arbitrary natural numbers). If the tap coefficient group is defined as Tc=(Tc11, Tc12, ..., Tc1m, Tc21, Tc22, ..., Tc2n) and the decision estimation signal set is defined as Sder=(Sd1, Sd2, ..., Sdm, Ser1, Ser2, ..., Sern), then the estimated error signal is Seerr=Sr−TcxtSder, where t represents transposition. In this instance, by sequentially updating the tap coefficient group with Tc(j+1)=Tc(j)−2×k×Seerr×Sder, tap coefficient group Tc can be controlled so that the square of the absolute value of estimated error signal Seerr may be minimum, where Tc(j) is a value of tap coefficient group Tc at sampling time jΔT where the sampling interval is represented by ΔT, and k is a parameter which determines the speed of conversion and the stability of the control. By the construction described above, even in such a case that the propagation environment sequentially varies, automatic equalization of distortion including a precursor component can be performed with a small amount of calculation and a small circuit scale.

FIGS. 6, 7, 8, 9 and 10 show respective modifications of the second embodiment of the invention shown in FIG. 4.

Figure 6:
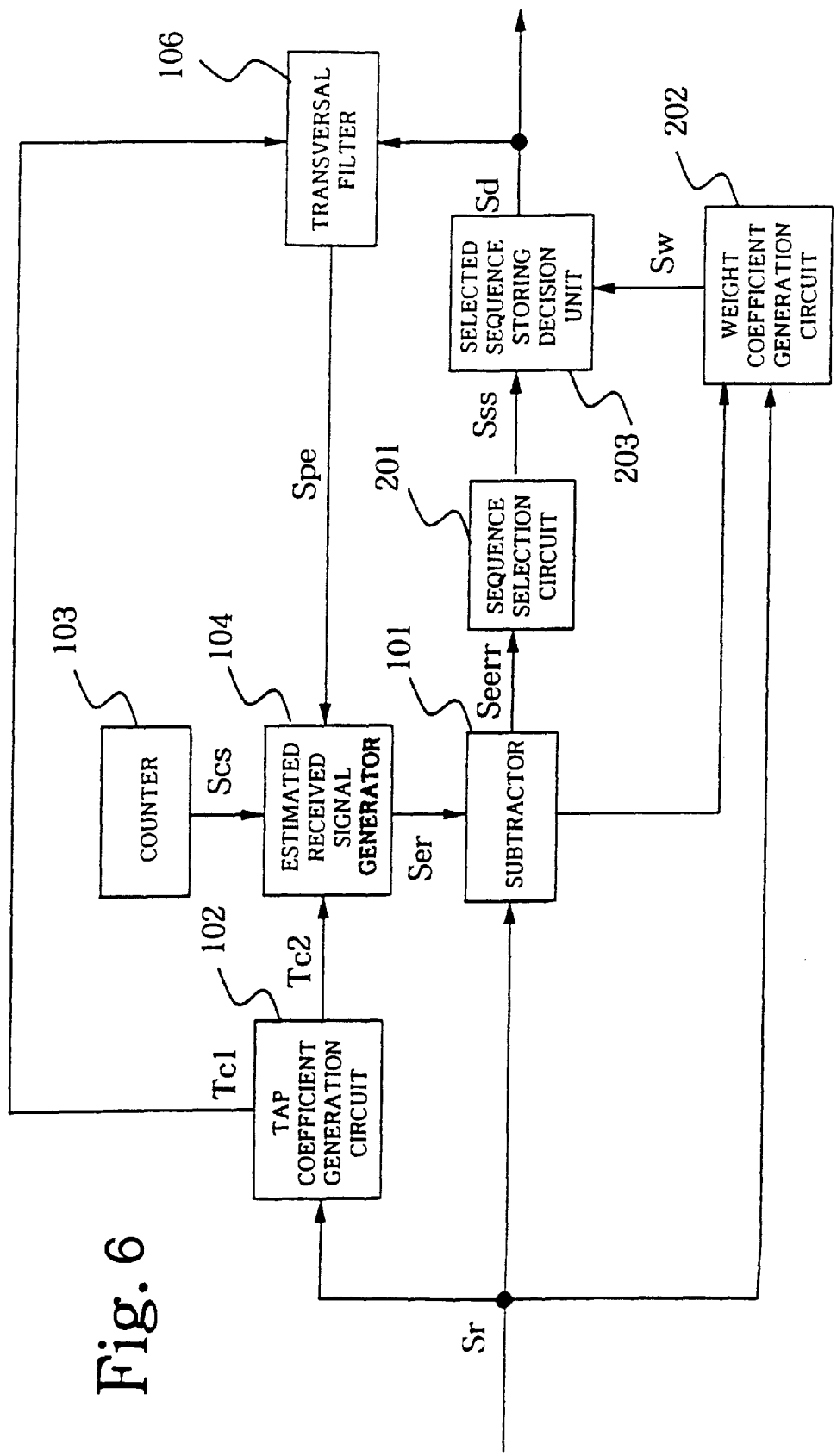
FIGS. 6, 7, 8, 9 and 10 show respective modifications of the second embodiment of the invention shown in FIG. 4.

In FIG. 6, the weight coefficient generation circuit 202 receives the estimated error signals Seerr from the subtractor 101 as an input thereto and decides and outputs the M weight coefficients based on absolute values of the estimated error signals.

Figure 7:
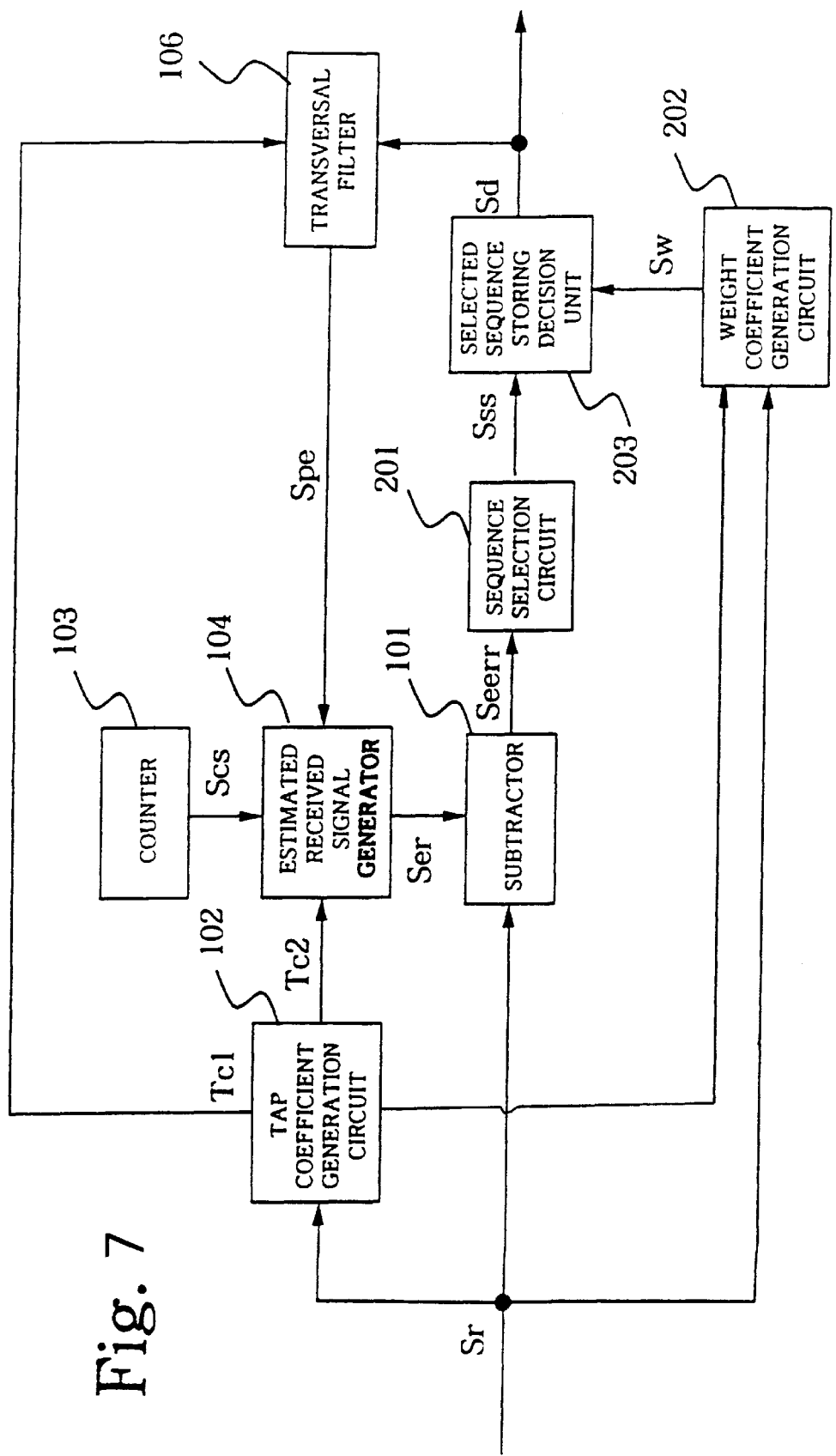

In FIG. 7, the weight coefficient generation circuit 202 receives the second tap coefficient group Tc2 as an input thereto and decides and outputs the M weight coefficients based on absolute values of the second tap coefficient group.

Figure 8:
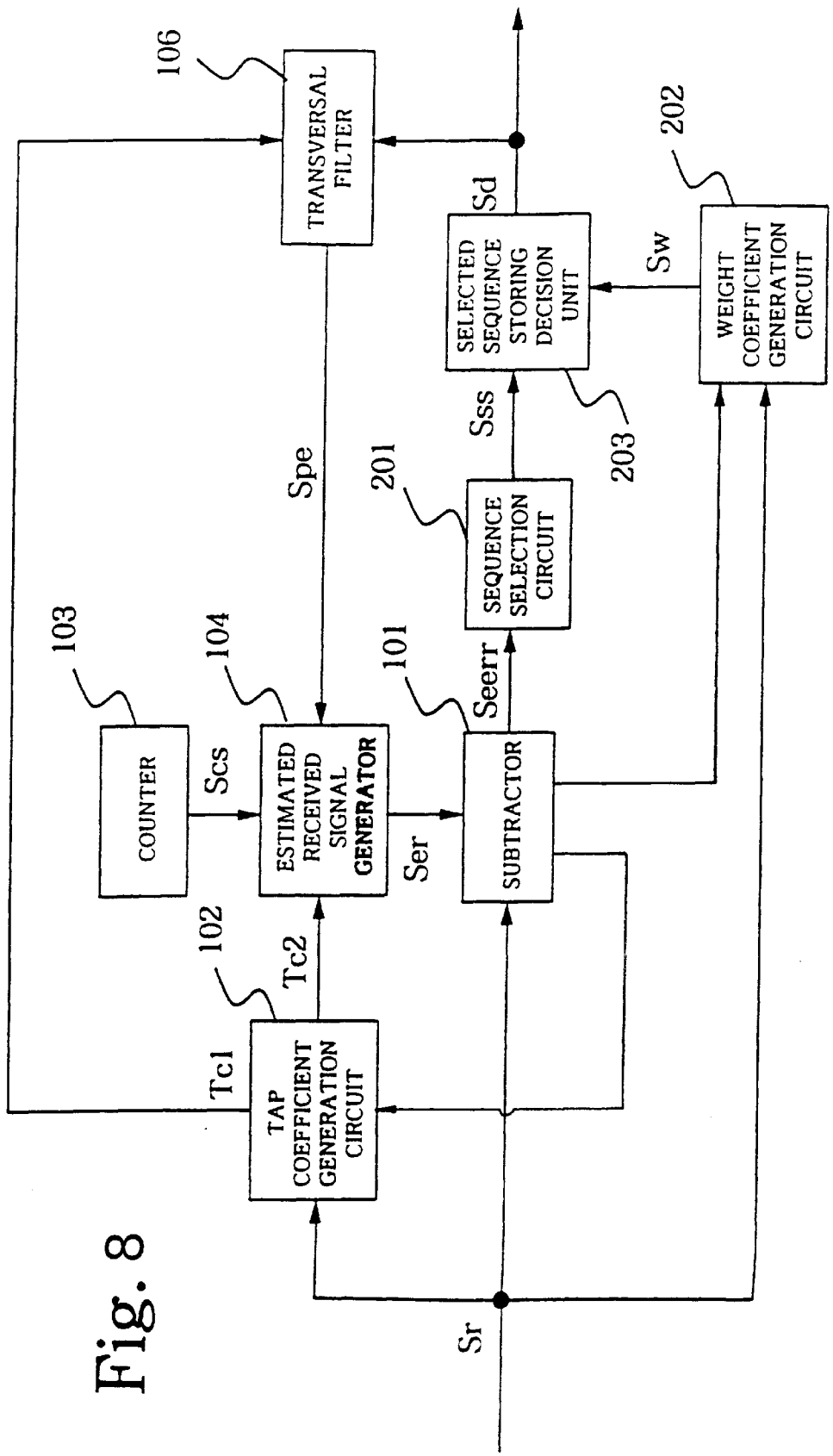

FIG. 8 shows a modification of the embodiment of FIG. 6 in which the tap coefficient generation circuit 102 additionally receives the estimated error signals Seerr as inputs thereto.

Figure 9:
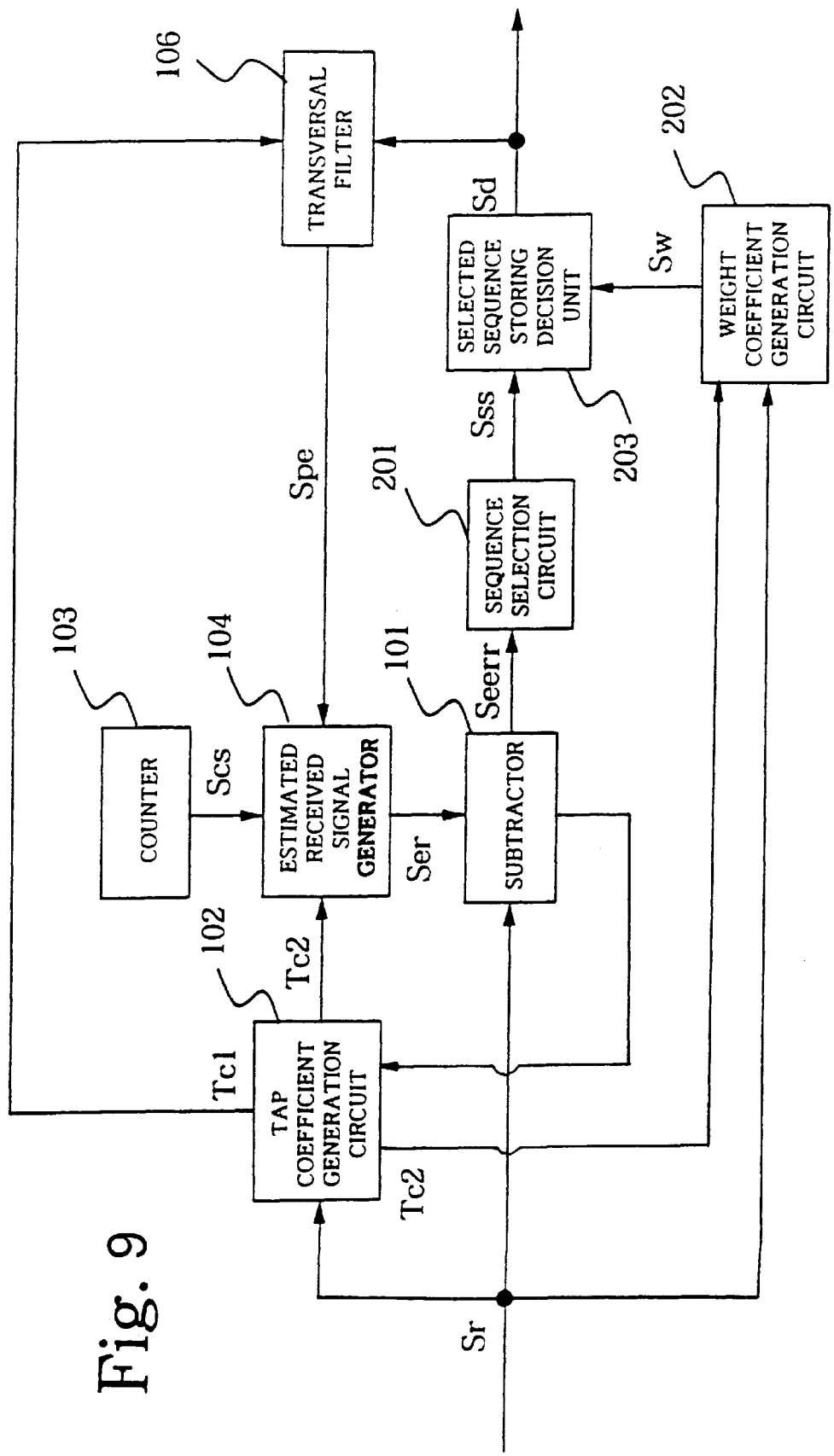

FIG. 9 shows a modification of the embodiment of FIG. 7 in which the tap coefficient generation circuit 102 additionally receives the estimated error signals Seerr as inputs thereto.

Figure 10:
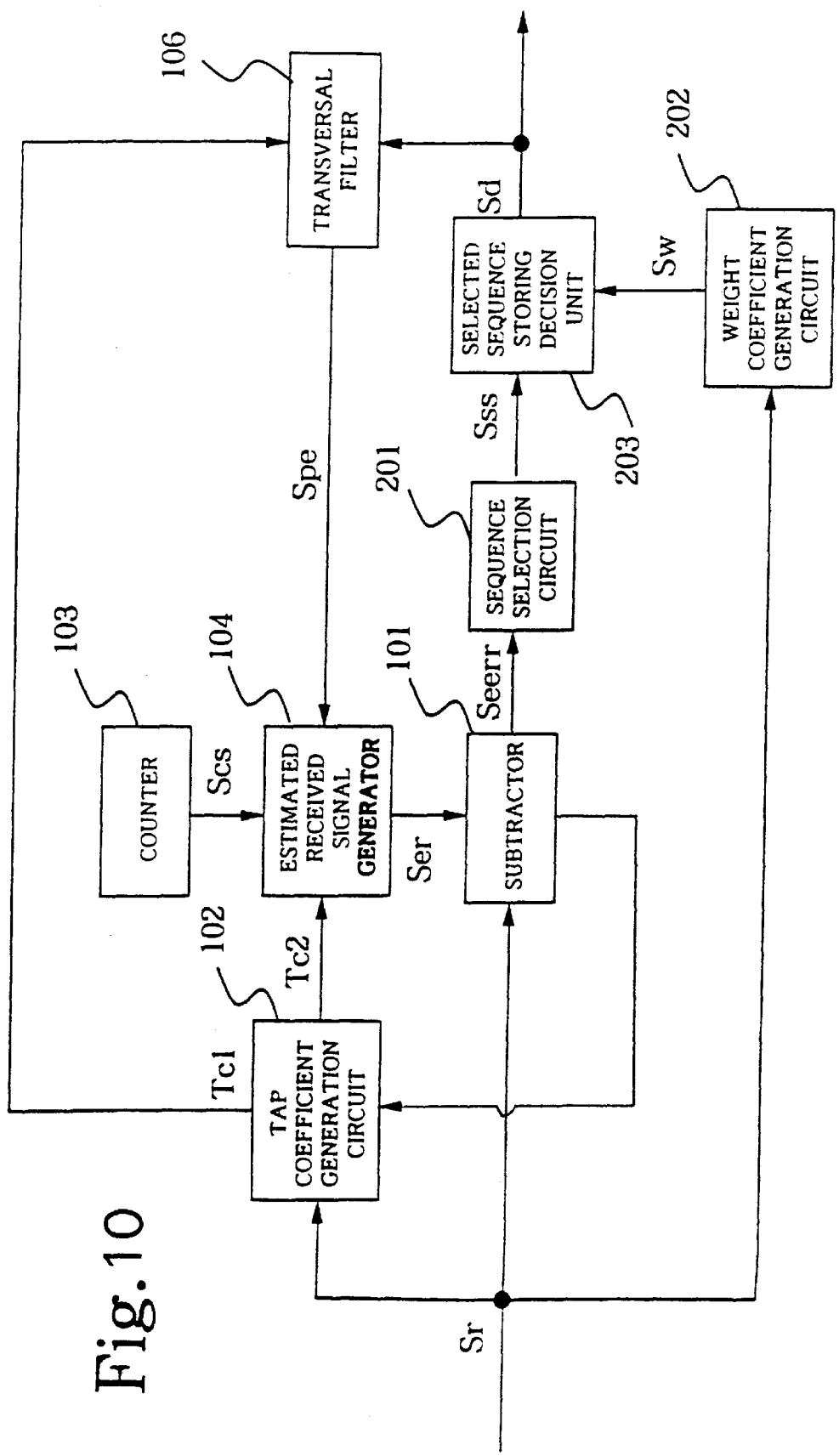

FIG. 10 shows a modification of the embodiment of FIG. 4 in which the tap coefficient generation circuit 102 additionally receives the estimated error signals Seerr as inputs thereto.

As described above, according to the present invention, automatic equalization of distortion including a precursor component can be realized with a small amount of calculation and a small circuit scale.

What is claimed is:

1. An automatic equalizer, comprising:

a subtractor for calculating differences between a received signal and N estimated received signals and outputting N estimated error signals;

a decision unit for outputting part of a transmission signal sequence corresponding to the one of the N estimated error signals which exhibits the lowest absolute value as a detected signal to the outside;

a tap coefficient generation circuit for receiving the received signal as an input thereto to produce an impulse response and outputting the impulse response as a first tap coefficient group corresponding to a postcursor component of the impulse response and a second tap coefficient group corresponding to a precursor signal of the impulse response;

a transversal filter for receiving the detected signal and the first tap coefficient group as inputs thereto and outputting a postcursor estimation signal; and an estimated received signal generator for receiving the postcursor estimation signal and the second tap coefficient group as inputs thereto and outputting the N estimated received signals corresponding to possible N transmission signal sequences.

2. An automatic equalizer as set forth in claim 1, wherein said estimated received signal generator receives N transmission signal sequences outputted from a counter, which outputs the N transmission signal sequences in the form of binary numbers, the second tap coefficient group and the postcursor estimation signal and outputs the N estimated received signals.

3. An automatic equalizer as set forth in claim 2, wherein said tap coefficient generation circuit receives the received signal and the estimated error signals as inputs thereto and outputs the first and second tap coefficient groups.

4. An automatic equalizer as set forth in claim 1, wherein said tap coefficient generation circuit receives the received signal and the estimated error signals as inputs thereto and outputs the first and second tap coefficient groups.

5. An automatic equalizer, comprising:

a subtractor for calculating differences between a received signal and N estimated received signals and outputting N estimated error signals, a sequence selector for outputting a transmission signal sequence corresponding to the one of the N estimated error signals which exhibits the lowest absolute value as a selected sequence signal, a tap coefficient generation circuit for receiving the received signal as an input thereto to produce an impulse response and outputting the impulse response as a first tap coefficient group corresponding to a postcursor component of the impulse response and a second tap coefficient group corresponding to a precursor signal of the impulse response, a weight coefficient generation circuit for generating M weight coefficients, M being an integer equal to or smaller than $\log_2 N$, and a selected sequence storing decision unit for receiving the M weight coefficients and the selected sequence signal as inputs thereto, storing the selected sequence signal by M times, deciding based on the weight coefficients corresponding to decision values for the same bit on the transmission side of the selected sequence signals for the M times, and outputting a detected signal;

a transversal filter for receiving the detected signal and the first tap coefficient group as inputs thereto and outputting a postcursor estimation signal, and an estimated received signal generator for receiving the postcursor estimation signal and the second tap coefficient group as inputs thereto and outputting to the subtractor the N estimated received signals corresponding to possible N transmission signal sequences.

6. An automatic equalizer as set forth in claim 5, wherein said estimated reception signal generator receives N transmission signal sequences outputted from a counter, which outputs the N transmission signal sequences in the form of binary numbers, the second tap coefficient group and the postcursor estimation signal and outputs the N estimated received signals.

7. An automatic equalizer as set forth in claim 6, wherein said tap coefficient generation circuit receives the received signal and the estimated error signals as inputs thereto and outputs the first and second tap coefficient groups.

8. An automatic equalizer as set forth in claim 5, wherein said weight coefficient generation circuit receives the received signal as an input thereto and decides and outputs the M weight coefficients based on an input level of the received signal.

9. An automatic equalizer as set forth in claim 8, wherein said tap coefficient generation circuit receives the received signal and the estimated error signals as inputs thereto and outputs the first and second tap coefficient groups.

10. An automatic equalizer as set forth in claim 5, wherein said weight coefficient generation circuit receives the estimated error signals as an input thereto and decides and outputs the M weight coefficients based on absolute values of the estimated error signals.

11. An automatic equalizer as set forth in claim 10, wherein said tap coefficient generation circuit receives the received signal and the estimated error signals as inputs thereto and outputs the first and second tap coefficient groups.

12. An automatic equalizer as set forth in claim 5, wherein said weight coefficient generation circuit receives the second tap coefficient group as an input thereto and decides and outputs the M weight coefficients based on absolute values of the second tap coefficient group.

13. An automatic equalizer as set forth in claim 12, wherein said tap coefficient generation circuit receives the received signal and the estimated error signals as inputs thereto and outputs the first and second tap coefficient groups.

14. A automatic equalizer as set forth in claim 5, wherein said tap coefficient generation circuit receives the received signal and the estimated error signals as inputs thereto and outputs the first and second tap coefficient groups.

* * * * *